United States Patent Office 3,373,104
Patented Mar. 12, 1968

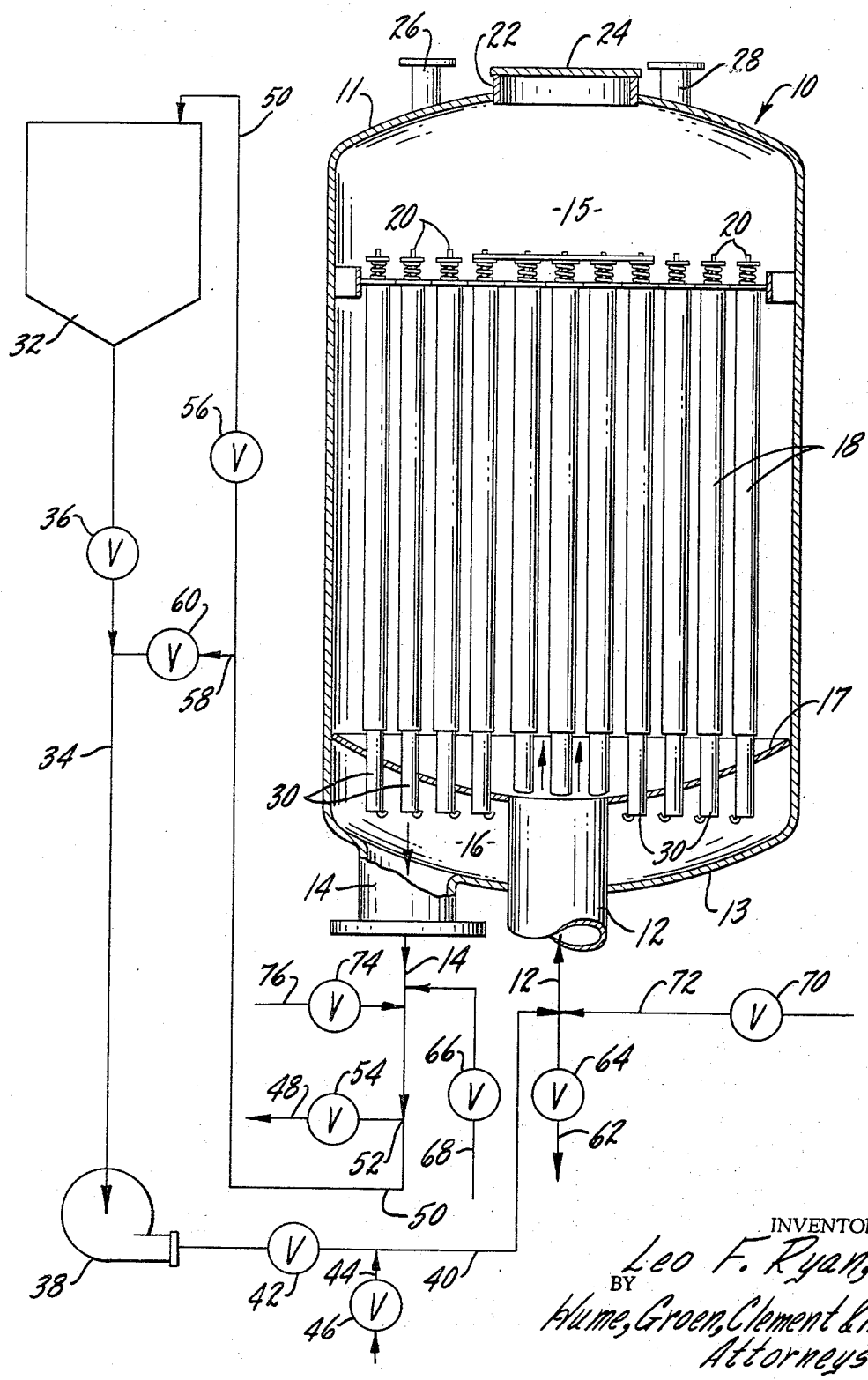

3,373,104
METHOD OF CLEANING FILTER TANK
Leo F. Ryan, Westwood, N.J., assignor to Union Tank Car Company, Chicago, Ill., a corporation of New Jersey
Filed Dec. 17, 1964, Ser. No. 419,126
15 Claims. (Cl. 210—32)

ABSTRACT OF THE DISCLOSURE

A method of cleaning pre-coated filters in a filter tank in which the tank is drained, then air is passed through the filters in reverse flow to normal operation while wash water is gradually added to the tank to gradually submerge the filters, whereafter the wash liquid is drained from the tank while air flow is continued, finally air flow is stopped and the filters are backwashed with liquid.

This invention relates to a method of cleaning a filter and, more particularly, to a method of cleaning a filter having a pre-coat layer of ion exchange resin particles in the size range of about 60 to 400 mesh.

It has recently been discovered that improved removal of impurities from a fluid may be obtained by passing the fluid through a filter comprising a filter screen precoated with a layer of ion exchange resin particles in the size range of about 60 to 400 mesh, hereinafter referred to sometimes as "finely divided" resin particles. This method is disclosed and claimed in co-pending application Ser. No. 263,999, filed Mar. 8, 1963, now U.S. Patent No. 3,250,703, issued on May 10, 1966, and assigned to the assignee of this application.

Cleaning the filter utilizing this method has heretofore presented some problems. The filters normally employed are annular cotton or nylon-wound filters. These filters are vertically positioned in a tank. Heretofore in cleaning these filters it has been difficult to obtain good cleaning of the lower portion of the filter. The cleaning technique heretofore used comprised simultaneously draining the filter tank while passing air or water in reverse flow through the filter. This method was found to be effective in cleaning the upper portion of the filter but was ineffective on the lower portion of the filter. It is therefore desirable to provide a method for cleaning such filters which effectively cleans the entire filter.

It is therefore an object of the present invention to provide a method of cleaning a filter.

It is another object to provide a method of cleaning a filter having a pre-coat layer of finely divided solids.

It is still another object to provide a method for cleaning a filter having a pre-coat of ion exchange resin particles in the size range of about 60 to 400 mesh.

It is yet another object to provide a method of cleaning annular-type, vertically positioned filters having a precoat of ion exchange resin particles in the size range of about 60 to 400 mesh.

These and other objects more apparent hereinafter are accomplished in accordance with the present invention by employing a cleaning method on vertically positioned filters comprising passing a gas through said filter in reverse flow while submerging said filter in a liquid, draining said filter of said liquid, and passing backwash water through said filter in reverse flow.

The invention, both as to its organization and method of operation, taken with further objects and advantages thereof, will be best understood by reference to the following description taken in conjunction with the accompanying drawings, in which:

The figure is a schematic representation of a filtering system embodying the features of the present invention, the filter tank of the system being partially cut away to illustrate the filters in the filter tank;

Referring to the figure, there is illustrated schematically a filter system for removing dissolved and undissolved impurities from water. Although the filter system will be discussed in detail with respect to the purification of water, the filter system has application to the purification of other liquids, such as sugar solutions, formaldehyde and the like.

The filter system includes a filter tank, indicated generally by reference numeral 10, having an inlet line 12 and an outlet line 14. The filter tank 10 is a generally cylindrical vessel made of steel or the like having an outwardly convex top 11 and an outwardly convex bottom 13. The tank 10 is divided into an influent zone 15 and a filtrate zone 16 by a downwardly convex tube sheet plate 17 suitably secured to the interior of the tank 10 by welding or the like. The influent line 12 extends through the bottom 13 of the tank and communicates with the influent zone 15 so that all the influent water is passed directly to the influent zone 15. The influent pipe 12 is attached to the tube sheet plate 17 by welding or the like. In this manner, direct communication between the influent zone 15 and the filtrate zone 16 is precluded.

Mounted within the influent zone 15 are a plurality of filters 18 through which the influent stream must pass before entering the filtrate zone 16 and being discharged from the filter tank 10 through the outlet line 14. The filters 18 are annular-shaped filter elements. In this instance, they are nylon-wound filter elements, though other natural and synthetic fibers may be employed as is well known in the art. Each filter 18 is held in place in the influent zone 15 of the filter tank 10 by a holding assembly indicated generally by reference numeral 20. The selection of a suitable holding assembly would, of course, be within the ordinary skill of one in the art. In this instance the holding assembly 20 is of the type disclosed and claimed in co-pending application Ser. No. 281,888, filed May 21, 1963, now U.S. Patent No. 3,279,608, issued on Oct. 18, 1966, and assigned to the assignee of the present application. It suffices to say that this holding assembly is adapted to releasably hold the filter 18 in place upon a filter seat means 30 which are attached to the tube sheet plate 17. The filters 18 are placed into and removed from the filter tank 10 through a small manhole opening 22 in the filter tank 10. The manhole opening 22 has a cover means 24 which may be removed or opened, as desired, to provide access to the interior of the filter tank 10.

The filter seat means 30 comprises a small pipe made of steel or the like which extends through a hole in the tube sheet plate 17 and is attached to the tube sheet plate 17 by welding or other suitable means. The filter seat means 30 is substantially parallel to the longitudinal axis of the filter tank 10 and connects the influent zone 15 with the filtrate zone 16. The filter seat means 30 provides a base for the filter cartridge 18, which is held in position on the cartridge seat means 30 by the holding assembly 20.

The filter tank 10 is also provided with a vent 26 and a spare inlet pipe 28, which in this instance is capped. The vent 26 may be of any suitable construction, the selection of appropriate vent means being dependent generally upon the use of the filter tank 10 and being within the ordinary skill of one in the art.

A water slurry of the pre-coat medium, in this instance finely divided ion exchange resin particles in the size range of about 60 to 400 mesh, is stored in a pre-coat tank 32. A slurry line 34, controlled by a slurry valve 36, connects the pre-coat tank with a slurry pump 38. A transfer line 40 connects the pump 38 with the inlet line 12 of the filter tank 10. A transfer valve 42 adjacent the pump 38 and in the transfer line 40 controls the passage of slurry or liquid from the pump 38.

The water to be treated enters the filter system through a feed line 44 having an intake control valve 46. The feed line 44 is connected to the transfer line 40 between the control transfer valve 42 and the inlet line 12.

The outlet line 14 from the filter tank 10 is connected to a service line 48 and a pre-coat return line 50 at a T-juncture indicated by reference numeral 52. The service line 48 is connected to service units not shown, such as a steam generator and the like, and has a service valve 54. The pre-coat return line 50 is connected to the pre-coat tank 32 and has a return valve 56 to control the flow of slurry back to the pre-coat tank 32.

A bridge line 58 with a bridge valve 60 interconnects the pre-coat return line 50 and the slurry line 34. A drain line 62 with a valve 64 communicates with the inlet line 12.

During the pre-coating step a pre-coat layer of finely divided ion exchange resin particles in the size range of about 60 to 400 mesh is deposited upon the upstream sides of the filters 18, i.e., the sides where the water is introduced into the filter 18. Similarly, during the filtering step a filter cake builds up within and on the upstream side of the pre-coat layer.

In preparing the filter system for operation the initial step is to pre-coat the filters 18. To these ends, the filter tank 10 is filled with low impurity water, such as demineralized water. A slurry of pre-coat medium and demineralized water is prepared in the pre-coat tank 32, the pre-coat medium being ion exchange resin particles in the size range of about 60 to 400 mesh.

During the pre-coating step all the valves are closed, except the slurry valve 36, the transfer valve 42 and the return valve 56. The pre-coating step is initiated by starting the pump 38, thereby drawing the resin pre-coat slurry from the pre-coat tank 32 and through the slurry line 34 to the pump 38. The slurry is forced by the pump 38 through the transfer line 40 and the inlet line 12 into the filter tank 10. The pressure of the incoming slurry forces the demineralized water in the filter tank 10 through the filters 18 and out of the filter tank 10 via the filtrate zone 16 and the outlet line 14. This demineralized water enters the pre-coat tank 32 through the return line 50.

As the cycling continues the pre-coat slurry is brought into contact with the upstream surfaces of the filters 18. The finely divided resin particles of the pre-coat medium are separated from the slurry and deposited as the pre-coat layer upon the upstream surfaces of the filters 18. The slurry is circulated through the filter system in this manner until a sufficient depth of the resin pre-coat layer is deposited upon the upstream surface of the filters 18. The pre-coating step is terminated by closing the valve 36 and the return valve 56 and opening the bridge valve 60. The pump 38 is kept running until the recycle stream is clear. Then the filter system is ready to be used to treat the feed water. The thickness of the pre-coat layer may be greater than a few inches, but it is preferred that the layer have a thickness in the range of about 1/16 to 2 inches, more preferably about 1/8 to 1 inch, and most preferably 1/8 to 5/8 inch.

The service run is begun by closing the bridge valve 60 and the transfer valve 42 and opening the service valve 54 and the intake valve 46. In this manner, untreated water enters the filter system through the feed line 44 and passes through the transfer line 40 and the inlet line 12 into the filter tank 10. The incoming untreated water passes through the feed line 44, the transfer line 40 and the inlet line 12 into the filter tank 10. The pressure of the incoming untreated water forces it through the resin pre-coat layer, the filters 18 and the filtrate zone 16 into the outlet line 14.

As the untreated water passes through the pre-coat layer, an ion exchange reaction takes place to remove dissolved impurities from the water. In addition, undissolved impurities are removed from the untreated water by virtue of the water passing through the filters 18 and the pre-coat layer of finely divided ion exchange resin particles. Filter cake, consisting of the undissolved impurities, builds up within and on the pre-coat layer as the process continues. The purified or treated water flows through the filtrate zone 16 and the outlet line 14 to the service line 48. The purified water is directed to a supply tank or suitable equipment by the service line 48.

Eventually the resins will become exhausted and must be regenerated or discarded. At this time the filtering or service cycle is stopped by closing the intake valve 46 and the service valve 54. The filter tank 10 is then cleaned in accordance with the method of the present invention. To these ends, the vent 26 and the drain valve 64 are opened and the filter tank 10 drained. The drain valve 64 is closed after draining is completed. The pre-coat layer remains on the filters 18 after the filter tank 10 has been drained. In accordance with the method of the present invention, a cleansing gas is passed into the interior of the filter 18 at its lower end to clean the filter 18 progressively from the bottom to the top. Accordingly, air is introduced into the interior of the filters 18 by opening a valve 66 in an air line 68 communicating with the outlet line 14. Air under pressure thereby enters the filtrate zone 16 and passes upwardly into the interior of the filters 18. Preferably, the flow rate of the air is in the range of about 3 to 10 cubic feet per minute per square feet of filter surface area. Simultaneously warm water having a temperature in the range of about 100 to 200° F. is added to the tank 10 by opening a valve 70 in a warm water line 72 communicating with the inlet line 12. The water is added at a rate so that the water level rises preferably in the range of about 2 to 3 inches per minute.

The air entering the filter tank 10 tends to pass first through the lower portion of the filter 18 and remove the pre-coat layer therefrom. The warm water being simultaneously added to the filter tank 10 assists in cleaning the filter 18 in two ways. Firstly, it provides an agitated liquid interface at the filter surface as it rises in the tank which, because of collapsing air bubbles, exerts pulling forces to remove particles from the filter surface. Secondly, the water carries away and dilutes the filter cake and pre-coat layer being removed from the filter surface. Sufficient warm water is added to submerge the filters 18 therein and then the valve 70 is closed. In this manner the filters 18 are cleaned progressively from the bottom to the top. Thereafter, the valve 64 is opened to drain the filter tank 10 of the warm water and the pre-coat material and filter cake removed from the filter. Preferably, the filter 10 is drained at a rate so that the water level therein falls in the range of about 4 to 6 inches per minute.

After the filter tank 10 has been drained the air supply is terminated by closing the valve 66. The filters 18 are then backwashed with a suitable liquid in the standard manner. To these ends, backwash water is passed in reverse flow through the filters 18 by opening a valve 74 in backwash line 76. Backwash water passes into the filtrate zone 16, upwardly through the filters 18 and in reverse flow through the filters 18 into the influent zone 15. The backwash water is removed from the tank 10 by opening the valve 64. After the backwash cycle has been terminated, the valves 64 and 74 are closed and the service cycle may then be repeated after the filters 18 have been pre-coated in the manner described hereinbefore.

Though air has been discussed specifically herein as the cleansing gas, other gases may be used as the cleansing gas, such as nitrogen, oxygen and the like. Air, however, is generally speaking, the most economical as it is readily available in most plants. Similarly, liquids other than water may be used during the gas cleansing cycle. Exemplary of such liquids are alcohols, carbontetrachloride and detergent and soap solutions. It is preferred that the liquids have a temperature in the range of about 100 to 200° F.

Typical solid cation exchange resin particles which may be employed in the specific filtering method discussed herein are the divinylbenzene-styrene copolymer type, the acrylic type, the sulfonated coal type and the phenolic type. These may be used in the sodium, hydrogen, ammonium or hydrazine form, for example. Typical solid anion exchange resin particles that may be employed are the phenolformaldehyde type, the divinylbenzene-styrene copolymer type, the acrylic type and the epoxy type. The anion resin particles may be used in the hydroxide or chloride form, for example.

Though the cleaning method of the present invention has been discussed in relation to a pre-coat layer of finely divided ion exchange resin particles, the method is likewise applicable where the pre-coat layer is diatomaceous earth, or any other pre-coat material, as will be understood by one with ordinary skill in the art. Similarly, the invention is applicable to any vertically positioned filter screen having a pre-coat layer thereon, such as leaf-type filters and the like.

While the embodiment herein is at present considered to be preferred, it will be understood that various modifications and improvements may be made therein and it is intended to cover in the appended claims all such modifications and improvements as fall within the true spirit and scope of the invention.

What is claimed is:

1. A method for cleaning a vertically positioned filter in a filter tank for treating influent liquid, said filter containing a pre-coat layer of finely divided solids, said method comprising draining influent liquid from said filter tank until the level of said influent liquid is at least below said filter, then passing a gas to a lower portion of said filter and through said filter in reverse flow to the normal operation of said filter while simultaneously gradually admitting wash liquid to the filter tank and submerging said filter in said wash liquid to form a gradually increasing, vertical liquid-gas interface along the filter to clean said filter, and thereafter passing backwash water through said filter in reverse flow to the normal operation of said filter.

2. A method for cleaning a filter vertically positioned in a filter tank for treating influent liquid, said filter containing a pre-coat layer of finely divided resin particles, said method comprising draining influent liquid from said filter tank until the level of said influent liquid is at least below said filter, then passing a gas to a lower portion of said filter and through said filter in reverse flow to the normal operation of said filter while simultaneously gradually adding wash liquid to said filter tank and gradually submerging said filter in said wash liquid to form a gradually increasing, vertical liquid-gas interface along the filter to clean said filter, draining said wash liquid from said filter tank, terminating said gas flow after said filter tank has been drained of said wash liquid, and thereafter passing backwash liquid through said filter in reverse flow to the normal operation of said filter.

3. The method of claim 2 wherein said gas is air and said wash liquid is warm water.

4. The method of claim 3 wherein said backwash liquid is water.

5. The method of claim 2 wherein said gas has a flow rate in the range of about 3 to 10 cubic feet per minute per square feet of filter surface area.

6. The method of claim 5 wherein said wash liquid is added to said filter tank at a rate so that the liquid level therein rises in the range of about 2 to 3 inches per minute.

7. The method of claim 6 wherein said wash liquid is drained from said filter tank at a rate so that the liquid level falls in the range of about 4 to 6 inches per minute.

8. The method of claim 2 wherein said pre-coat layer remains on said filter after influent liquid has been drained from said filter tank.

9. A method for cleaning a vertically positioned filter in a filter tank for treating influent liquid, said filter containing a pre-coat layer of ion exchange resin particles in the size range of about 60 to 400 mesh which comprises draining influent liquid from said filter tank until the level of said influent liquid is at least below said filter, then passing a gas to a lower portion of said filter and through said filter in reverse flow to the normal operation of said filter while simultaneously gradually adding a wash liquid to said filter tank and gradually submerging said filter in said wash liquid to form a gradually increasing, vertical liquid-gas interface along the filter to clean said filter, draining said wash liquid from said filter tank, terminating said flow of gas through said filter after said filter tank has been drained of said wash liquid, and thereafter passing a backwash liquid through said filter in reverse flow to the normal operation of said filter.

10. The method of claim 9 wherein said gas is air.

11. The method of claim 9 wherein said filter is an annular-shaped, fiber-wound filter, said gas being introduced into the interior of said filter at its lower end.

12. The method of claim 11 wherein said wash liquid is water having a temperature in the range of about 100 to 200° F., said water being added to said filter tank at a rate so that the water level therein rises in the range of about 3 to 4 inches per minute.

13. The method of claim 12 wherein said gas has a flow rate in the range of about 3 to 10 cubic feet per minute per square feet of filter surface area.

14. The method of claim 12 wherein said water is drained from said filter tank at a rate so that the water level therein falls in the range of about 4 to 6 inches per minute.

15. The method of claim 9 wherein said pre-coat layer remains on said filter after influent liquid has been drained from said filter tank.

References Cited

UNITED STATES PATENTS

| | | | |
|---|---|---|---|
| 2,681,153 | 6/1954 | Armbrust | 210—82 |
| 2,780,363 | 2/1957 | Pew | 210—82 |
| 3,225,933 | 12/1965 | Berline | 210—333 |
| 3,250,704 | 5/1966 | Levendusky | 210—24 |
| 3,280,978 | 10/1966 | Scott | 210—82 |

SAMIH N. ZAHARNA, *Primary Examiner.*

MORRIS O. WOLK, *Examiner.*

E. G. WHITBY, C. DITLOW, *Assistant Examiners.*